US010487769B2

United States Patent
Imai et al.

(10) Patent No.: US 10,487,769 B2
(45) Date of Patent: Nov. 26, 2019

(54) FUEL INJECTION CONTROL APPARATUS FOR INTERNAL COMBUSTION ENGINE AND METHOD FOR OPERATING FUEL INJECTION CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Sohichi Imai, Toyota (JP); Motohiro Sugimoto, Toyota (JP); Masanao Idogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/114,568

(22) Filed: Aug. 28, 2018

(65) Prior Publication Data

US 2019/0093591 A1   Mar. 28, 2019

(30) Foreign Application Priority Data

Sep. 25, 2017   (JP) .................................. 2017-183613

(51) Int. Cl.
| | |
|---|---|
| *F02D 41/38* | (2006.01) |
| *F02D 1/06* | (2006.01) |
| *F02D 19/06* | (2006.01) |
| *F02D 41/32* | (2006.01) |
| *F02D 45/00* | (2006.01) |
| *F02M 59/36* | (2006.01) |

(Continued)

(52) U.S. Cl.
CPC ........... *F02D 41/3854* (2013.01); *F02D 1/06* (2013.01); *F02D 19/0686* (2013.01);
(Continued)

(58) Field of Classification Search
CPC ...... F02D 41/3854; F02D 41/40; F02D 41/34; F02D 41/1401; F02D 1/06; F02D 41/32;
(Continued)

(56) References Cited

U.S. PATENT DOCUMENTS

2007/0006849 A1\*  1/2007  Mashiki ............... F02D 41/406
                                                                123/457
2007/0017483 A1\*  1/2007  Tahara ................. F02D 41/221
                                                                123/431

(Continued)

FOREIGN PATENT DOCUMENTS

| JP | 2013-092077 A | 5/2013 |
| JP | 2016-217324 A | 12/2016 |
| JP | 2017-133486 A | 8/2017 |

*Primary Examiner* — Hung Q Nguyen
*Assistant Examiner* — Brian P Monahon
(74) *Attorney, Agent, or Firm* — Oliff PLC

(57) ABSTRACT

A fuel injection control apparatus for an internal combustion engine includes a low pressure fuel pump, a low pressure fuel passage, a high pressure fuel pump, a high pressure fuel passage, a fuel injection valve, a high pressure controller, and a low pressure controller. The low pressure controller calculates a feedforward correction amount that increases as a request injection amount of the fuel injection valve increases and an increase rate of the high pressure target value increases when a high pressure target value increases. The low pressure controller calculates a feedback correction amount based on a low-side pressure deviation when the high pressure target value increases. The low pressure controller controls driving of the low pressure fuel pump based on a sum of the feedforward correction amount and the feedback correction amount.

6 Claims, 4 Drawing Sheets

(51) Int. Cl.
*F02M 69/04* (2006.01)
*F02D 1/00* (2006.01)
(52) U.S. Cl.
CPC ............. *F02D 41/32* (2013.01); *F02D 45/00* (2013.01); *F02M 59/361* (2013.01); *F02M 69/046* (2013.01); *F02D 2001/009* (2013.01); *F02D 2200/101* (2013.01); *F02M 2200/09* (2013.01)
(58) Field of Classification Search
CPC ................ F02D 45/00; F02D 19/0686; F02D 2200/0602; F02D 2041/141; F02D 2001/009; F02D 2200/101; F02M 69/046; F02M 59/361; F02M 2200/09
See application file for complete search history.

(56) References Cited

U.S. PATENT DOCUMENTS

| | | | |
|---|---|---|---|
| 2007/0295310 A1* | 12/2007 | Achleitner | F02D 41/3082 123/495 |
| 2008/0072880 A1* | 3/2008 | Wachtendorf | F02D 41/2464 123/495 |
| 2010/0274467 A1* | 10/2010 | Hayami | F02D 41/2438 701/103 |
| 2011/0106393 A1* | 5/2011 | Pursifull | F02D 33/003 701/101 |
| 2014/0053812 A1* | 2/2014 | Kojima | F02M 63/0245 123/457 |
| 2014/0230794 A1* | 8/2014 | Surnilla | F02M 37/04 123/495 |
| 2014/0250869 A1 | 9/2014 | Kawabe et al. | |
| 2014/0251269 A1* | 9/2014 | Hattar | F02D 1/02 123/357 |
| 2014/0299103 A1* | 10/2014 | Yanoto | F02D 41/064 123/447 |
| 2015/0144108 A1* | 5/2015 | Kim | F02M 69/54 123/460 |
| 2015/0252764 A1* | 9/2015 | Cho | F02M 59/20 123/496 |
| 2016/0146146 A1* | 5/2016 | Pursifull | F02D 41/3854 701/104 |
| 2017/0204803 A1* | 7/2017 | Pursifull | F02D 41/3845 |
| 2017/0342936 A1* | 11/2017 | Pursifull | F02D 41/3854 |
| 2018/0142642 A1* | 5/2018 | Grime | F02D 41/3082 |

* cited by examiner

FUEL INJECTION CONTROL APPARATUS FOR INTERNAL COMBUSTION ENGINE AND METHOD FOR OPERATING FUEL INJECTION CONTROL APPARATUS FOR INTERNAL COMBUSTION ENGINE

BACKGROUND

The present disclosure relates to a fuel injection control apparatus for an internal combustion engine and a method for operating the fuel injection control apparatus.

Japanese Laid-Open Patent Publication No. 2016-217324 describes one example of a fuel injection control apparatus for an internal combustion engine. The device includes a low pressure fuel pump that pumps fuel from a fuel tank, a low pressure fuel passage through which the fuel discharged from the low pressure fuel pump flows, a high pressure fuel pump that pressurizes the fuel supplied from the low pressure fuel passage, a high pressure fuel passage through which the fuel pressurized by the high pressure fuel pump flows, and a fuel injection valve that injects the fuel of the high pressure fuel passage.

The device further includes a regulator connected to the low pressure fuel passage. When fuel pressure of the low pressure fuel passage is higher than or equal to a predetermined pressure, the regulator is actuated to return the fuel from the low pressure fuel passage into the fuel tank so that a further increase in the fuel pressure is limited. In other words, the regulator adjusts the fuel pressure of the low pressure fuel passage.

To reduce energy consumption and improve fuel economy of internal combustion engines, a fuel injection control apparatus that controls a driving amount of a low pressure fuel pump to adjust fuel pressure of the low pressure fuel passage has been developed. In such a device, the driving amount of the low pressure fuel pump is calculated, for example, based on the sum of a feedforward correction amount and a feedback correction amount. The feedforward correction amount is calculated to increase as a request injection amount of a fuel injection valve increases. The feedback correction amount is calculated based on a deviation of fuel pressure of the low pressure fuel passage from its target value. The fuel pressure of the low pressure fuel passage is adjusted by controlling the low pressure fuel pump at the driving amount calculated as described above.

In a device including a low pressure fuel pump and a high pressure fuel pump, a high pressure target value, which is a target value of fuel pressure of the high pressure fuel passage, may be changed by a running state of the internal combustion engine and the like. For example, when the high pressure target value is increased, the high pressure fuel pump is driven to increase the fuel pressure of the high pressure fuel passage to the high pressure target value. In this case, the high pressure fuel pump is driven to supply fuel corresponding to the increased amount of the high pressure target value from the low pressure fuel passage to the high pressure fuel passage. At this time, the feedback correction amount does not increase until the absolute value of the deviation of the fuel pressure of the low pressure fuel passage from its target value is increased to a certain level. Therefore, when the low pressure fuel pump is controlled at the driving amount based on the sum of the feedforward correction amount and the feedback correction amount calculated as described above, the amount of fuel discharged from the low pressure fuel pump will not be increased until the absolute value of the deviation of the fuel pressure of the low pressure fuel passage from its target value is increased to a certain level. Consequently, the fuel pressure of the low pressure fuel passage decreases.

Additionally, the capacity of recent high pressure fuel passages has been increasing. As the capacity of a high pressure fuel passage increases, the low pressure fuel passage will supply a greater amount of fuel to the high pressure fuel passage to increase the fuel pressure of the high pressure fuel passage. In other words, as the capacity of a high pressure fuel passage increases, a greater amount of the fuel pressure of the low pressure fuel passage will be decreased by an increase in the high pressure target value. A significant decrease in the fuel pressure of the low pressure fuel passage may allow vapor to be generated in the low pressure fuel passage.

In a device that adjusts fuel pressure of a low pressure fuel passage by driving a low pressure fuel pump, there is room for improvement for limiting decreases in the fuel pressure of the low pressure fuel passage when a high pressure target value is increased.

SUMMARY

One aspect of the present disclosure is a fuel injection control apparatus for an internal combustion engine that includes a low pressure fuel pump configured to pump fuel from a fuel tank, a low pressure fuel passage through which the fuel discharged from the low pressure fuel pump flows, a high pressure fuel pump configured to pressurize the fuel supplied from the low pressure fuel passage, a high pressure fuel passage through which the fuel pressurized by the high pressure fuel pump flows, a fuel injection valve configured to inject the fuel of the high pressure fuel passage, a high pressure controller configured to control driving of the high pressure fuel pump so that fuel pressure of the high pressure fuel passage approaches a high pressure target value, which is a target value of the fuel pressure, and a low pressure controller configured to control driving of the low pressure fuel pump. The low pressure controller is configured to calculate a feedforward correction amount so that when the high pressure target value increases, the feedforward correction amount increases as a request injection amount of the fuel injection valve increases and also increases as an increase rate of the high pressure target value increases. The low pressure controller is configured to calculate a feedback correction amount based on a low-side pressure deviation when the high pressure target value increases. The low-side pressure deviation is a difference obtained by subtracting fuel pressure of the low pressure fuel passage from a low pressure target value, which is a target value of fuel pressure of the low pressure fuel passage. The low pressure controller is further configured to control driving of the low pressure fuel pump based on a sum of the feedforward correction amount and the feedback correction amount.

One aspect of the present disclosure is a method for operating a fuel injection control apparatus for an internal combustion engine. The fuel injection control apparatus includes a low pressure fuel pump configured to pump fuel from a fuel tank, a low pressure fuel passage through which the fuel discharged from the low pressure fuel pump flows, a high pressure fuel pump configured to pressurize the fuel supplied from the low pressure fuel passage, a high pressure fuel passage through which the fuel pressurized by the high pressure fuel pump flows, and a fuel injection valve configured to inject the fuel of the high pressure fuel passage. The method includes controlling driving of the high pressure fuel pump so that fuel pressure of the high pressure fuel passage approaches a high pressure target value, which is a target value of the fuel pressure, controlling driving of the low pressure fuel pump, calculating a feedforward correction amount so that when the high pressure target value increases, the feedforward correction amount increases as a request injection amount of the fuel injection valve increases and also increases as an increase rate of the high pressure target value increases, calculating a feedback correction amount based on a low-side pressure deviation when the high pressure target value increases, in which the low-side pressure deviation is a difference obtained by subtracting fuel pressure of the low pressure fuel passage from a low pressure target value, which is a target value of fuel pressure of the low pressure fuel passage, and controlling driving of the low pressure fuel pump based on a sum of the feedforward correction amount and the feedback correction amount.

One aspect of the present disclosure is a fuel injection control apparatus for an internal combustion engine that includes a low pressure fuel pump configured to pump fuel from a fuel tank, a low pressure fuel passage through which the fuel discharged from the low pressure fuel pump flows, a high pressure fuel pump configured to pressurize the fuel supplied from the low pressure fuel passage, a high pressure fuel passage through which the fuel pressurized by the high pressure fuel pump flows, a fuel injection valve configured to inject the fuel of the high pressure fuel passage, and circuitry. The circuitry is configured to perform controlling driving of the high pressure fuel pump so that fuel pressure of the high pressure fuel passage approaches a high pressure target value, which is a target value of the fuel pressure, controlling driving of the low pressure fuel pump, calculating a feedforward correction amount so that when the high pressure target value increases, the feedforward correction amount increases as a request injection amount of the fuel injection valve increases and also increases as an increase rate of the high pressure target value increases, calculating a feedback correction amount based on a low-side pressure deviation when the high pressure target value increases, in which the low-side pressure deviation is a difference obtained by subtracting fuel pressure of the low pressure fuel passage from a low pressure target value, which is a target value of fuel pressure of the low pressure fuel passage, and controlling driving of the low pressure fuel pump based on a sum of the feedforward correction amount and the feedback correction amount.

With the above configuration, when the high pressure target value is increased, the feedforward correction amount is calculated based on the increase rate of the high pressure target value in addition to the request injection amount of the fuel injection valve. As a result, when the high pressure target value is increased, the feedforward correction amount is greater than a case in which the feedforward correction amount is calculated based on only the request injection amount of the fuel injection valve. Thus, the amount of fuel supplied by the low pressure fuel pump to the low pressure fuel passage is increased before the low-side pressure deviation is increased to a certain level, that is, before the feedback correction amount is increased. This limits decreases in the fuel pressure of the low pressure fuel passage when the high pressure target value is increased.

There is a time lag due to a response delay of the low pressure fuel pump from when a request for an increase in the driving amount of the low pressure fuel pump is made until the amount of fuel supplied by the low pressure fuel pump to the low pressure fuel passage is actually increased. Thus, even when the low pressure fuel pump is controlled based on the sum of the feedforward correction amount, which is calculated based on an increased amount of the high pressure target value, and the feedback correction amount, an increase in the high pressure target value may cause a temporary decrease in the fuel pressure of the low pressure fuel passage.

When the fuel pressure of the low pressure fuel passage is decreased due to an increase in the high pressure target value, the low-side pressure deviation increases. This causes an increase in the feedback correction amount, which is calculated by the low pressure controller.

More specifically, when the low-side pressure deviation is increased due to an increase in the high pressure target value, the feedback correction amount is increased. This may cause the driving amount of the low pressure fuel pump, which is controlled based on the sum of the feedforward correction amount and the feedback correction amount, to be excessive. In this case, the low pressure fuel pump supplies an excessive amount of fuel from the fuel tank to the low pressure fuel passage. As a result, the fuel pressure of the low pressure fuel passage easily exceeds the low pressure target value.

In this regard, when the high pressure target value is increased, it is preferred that the low pressure controller calculate the feedforward correction amount so that the feedforward correction amount is decreased as the low-side pressure deviation increases.

With the above configuration, when the low-side pressure deviation is increased due to an increase in the high pressure target value and the feedback correction amount is increased, the feedforward correction amount is calculated so that the feedforward correction amount is decreased as the low-side pressure deviation increases. More specifically, when the feedback correction amount starts to increase as described above, the feedforward correction amount is decreased. Thus, a situation in which the low pressure fuel pump supplies an excessive amount of fuel from the fuel tank to the low pressure fuel passage is limited. Accordingly, the fuel pressure of the low pressure fuel passage will not easily exceed the low pressure target value.

The high pressure fuel pump may be configured to be driven by rotation of a camshaft of the internal combustion engine. In this case, since the camshaft rotates in synchronization with an engine output shaft, the rotation speed of the camshaft increases as the engine rotation speed increases. More specifically, the amount of fuel discharged from the high pressure fuel pump tends to increase as the engine rotation speed increases. When the fuel discharge amount of the high pressure fuel pump is increased, the fuel pressure of the low pressure fuel passage tends to decrease.

In this regard, it is preferred that the fuel injection control apparatus for the internal combustion engine include a high pressure target value calculator that calculates the high pressure target value so that when the high pressure target value is increased, the increase rate of the high pressure target value is lower when the engine rotation speed is high than when the engine rotation speed is low. With this configuration, when the engine rotation speed is high, the high pressure target value is increased more slowly than when the engine rotation speed is low. This limits occurrence of a decrease in the fuel pressure of the low pressure fuel passage caused by an increase in the high pressure target value. Thus, when the high pressure target value is increased, the fuel pressure of the low pressure fuel passage will not easily decrease.

Additionally, the above fuel injection valve is a high pressure fuel injection valve, and the fuel injection control apparatus may include a low pressure fuel injection valve configured to inject fuel of the low pressure fuel passage. In such a fuel injection control apparatus, it is preferred that the low pressure controller calculate the feedforward correction amount so that the feedforward correction amount is increased as the sum of the request injection amount of the high pressure fuel injection valve and the request injection amount of the low pressure fuel injection valve increases.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION

One embodiment of a fuel injection control apparatus for an internal combustion engine will now be described with reference to FIGS. 1 to 6.

Figure 1:
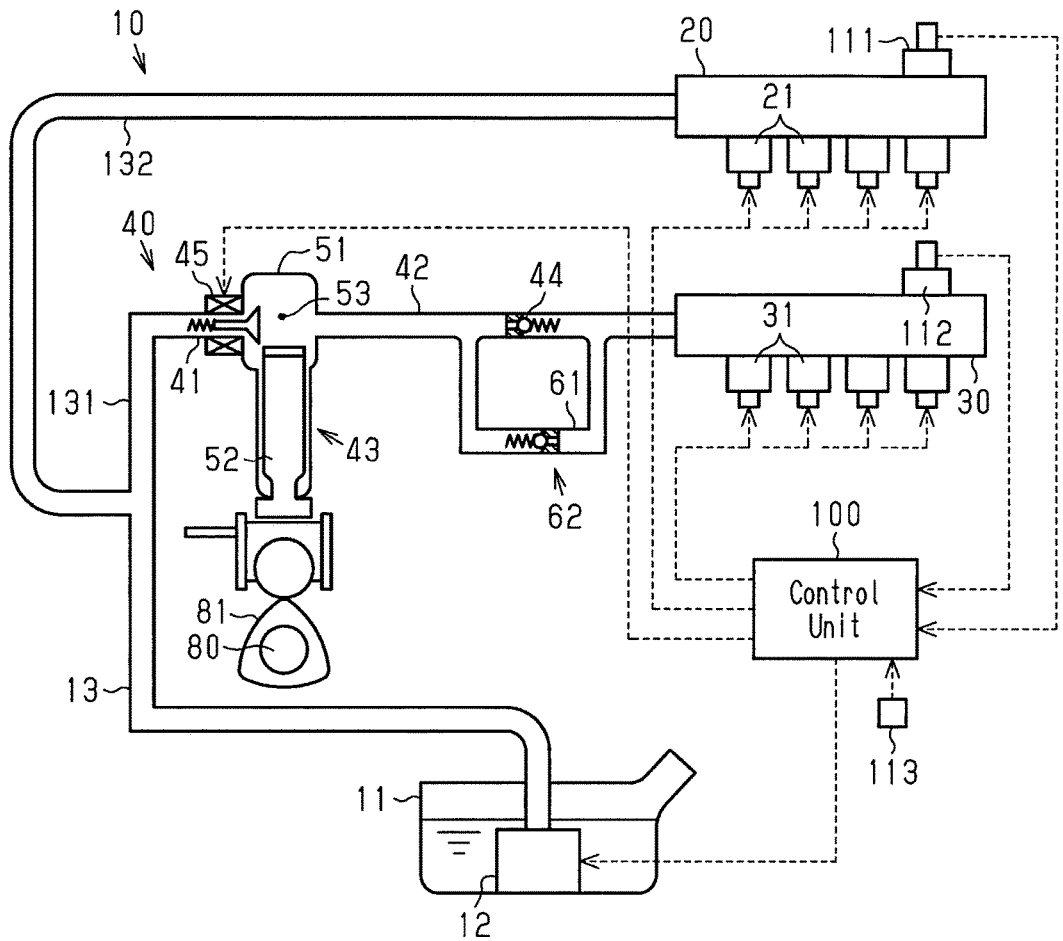
FIG. 1 is a diagram showing one embodiment of a fuel injection control apparatus for an internal combustion engine.

As shown in FIG. 1, the present embodiment of a fuel injection control apparatus 10 includes a fuel tank 11 storing fuel for driving the engine, a plurality of direct fuel injection valves 31 directly injecting the fuel into a plurality of cylinders of the internal combustion engine, and a plurality of port fuel injection valves 21 injecting the fuel into an intake passage of the internal combustion engine. The fuel injection control apparatus 10 further includes an electric low pressure fuel pump 12 that pumps the fuel from the fuel tank 11 and a low pressure fuel passage 13 through which the fuel supplied from the low pressure fuel pump 12 flows. The low pressure fuel passage 13 is divided into two passages at a downstream side. One of the two passages is a first branch passage 131, and the other passage is a second branch passage 132. The second branch passage 132 includes a port delivery pipe 20. In the present embodiment, the port delivery pipe 20 is also a component of the low pressure fuel passage 13. The fuel in the port delivery pipe 20 is injected from the port fuel injection valves 21. More specifically, in the present embodiment, each of the port fuel injection valves 21 corresponds to a "low pressure fuel injection valve."

The first branch passage 131 is connected to a high pressure fuel pump 40 that pressurizes the fuel supplied from the first branch passage 131. The high pressure fuel, which is pressurized by the high pressure fuel pump 40, is supplied to a direct injection delivery pipe 30. In the present embodiment, the direct injection delivery pipe 30 corresponds to one example of a "high pressure fuel passage" through which fuel that is pressurized by the high pressure fuel pump 40 flows. The fuel in the direct injection delivery pipe 30 is injected from the direct fuel injection valves 31.

More specifically, in the present embodiment, each of the direct fuel injection valves 31 corresponds to a "high pressure fuel injection valve."

As shown in FIG. 1, the high pressure fuel pump 40 includes an intake passage 41 connected to the low pressure fuel passage 13, a discharge passage 42 connected to the direct injection delivery pipe 30, and a pressurization portion 43. The pressurization portion 43 includes a pressurization chamber 53, which is in communication with the intake passage 41 and the discharge passage 42. The discharge passage 42 includes a discharge check valve 44, which allows the fuel to flow from the pressurization chamber 53 toward the direct injection delivery pipe 30 and restricts flow of the fuel from the direct injection delivery pipe 30 toward the pressurization chamber 53. The high pressure fuel pump 40 includes an electric intake valve 45, which allows the fuel to flow between the low pressure fuel passage 13 and the pressurization chamber 53 through the intake passage 41 when open and restricts flow of the fuel between the low pressure fuel passage 13 and the pressurization chamber 53 through the intake passage 41 when closed. The opening and closing operations of the intake valve 45 are controlled by a control unit 100.

The pressurization portion 43 pressurizes the fuel that enters the pressurization chamber 53 and discharges the pressurized fuel to the discharge passage 42. More specifically, as shown in FIG. 1, the pressurization portion 43 includes a cylinder 51 and a plunger 52 that reciprocates in the cylinder 51 in vertical directions. The pressurization chamber 53 is defined by the cylinder 51 and the plunger 52. The plunger 52 reciprocates in accordance with rotation of a cam piece 81 that rotates integrally with a camshaft 80 of the internal combustion engine. The reciprocal movement of the plunger 52 changes the volume of the pressurization chamber 53. Thus, the high pressure fuel pump 40 is driven by rotation of the camshaft 80.

When the plunger 52 moves upward with the intake valve 45 closed, the volume of the pressurization chamber 53 is decreased, and the fuel pressure of the pressurization chamber 53 increases. When the increase in the fuel pressure of the pressurization chamber 53 causes the discharge check valve 44 to open, the fuel is supplied from the pressurization chamber 53 through the discharge passage 42 to the direct injection delivery pipe 30. When the plunger 52 moves downward with the intake valve 45 open, the volume of the pressurization chamber 53 is increased, and the fuel is supplied to the pressurization chamber 53 through the intake passage 41. More specifically, when the reciprocal movement of the plunger 52 cooperates with the opening and closing operations of the intake valve 45, the fuel is drawn from the low pressure fuel passage 13 into the pressurization chamber 53, is pressurized by the pressurization chamber 53, and is supplied to the direct injection delivery pipe 30.

The fuel injection control apparatus 10 further includes a relief passage 61 connected to the discharge passage 42 to bypass the discharge check valve 44. The relief passage 61 includes a relief valve 62 that limits an excessive increase in the fuel pressure of the direct injection delivery pipe 30. The relief valve 62 allows the fuel to flow from the direct injection delivery pipe 30 toward the pressurization chamber 53 and restricts flow of the fuel from the pressurization chamber 53 toward the direct injection delivery pipe 30.

The control unit 100 will now be described with reference to FIGS. 1 and 2. The control unit 100 may be configured as circuitry that includes 1) one or more processors operating in accordance with computer programs (software), 2) one or more dedicated hardware circuits such as ASICs, or 3) a combination of these. The processors include a CPU and a memory such as a RAM and a ROM. The memory stores program codes or instructions configured to have the CPU execute processes. The memory, or a computer readable medium, includes any available media accessible with a versatile or dedicated computer.

As shown in FIG. 1, the control unit 100 receives detection signals from various sensors such as a port fuel pressure sensor 111, a direct injection fuel pressure sensor 112, and an engine rotation speed sensor 113. The port fuel pressure sensor 111 outputs a signal corresponding to low-side fuel pressure PL, which is the fuel pressure of the port delivery pipe 20. The direct injection fuel pressure sensor 112 outputs a signal corresponding to high-side fuel pressure PH, which is the fuel pressure of the direct injection delivery pipe 30. The engine rotation speed sensor 113 outputs a signal corresponding to an engine rotation speed NE, which is rotation speed of an engine output shaft.

Figure 2:
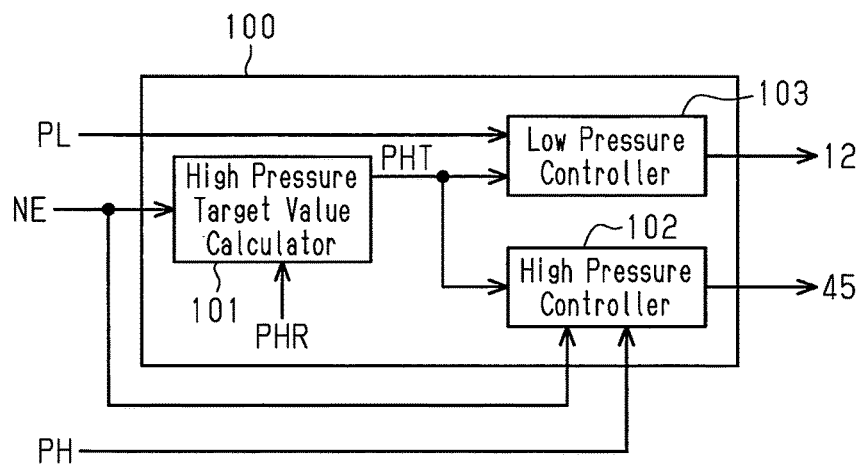
FIG. 2 is a block diagram showing the functional configuration of a control unit in the fuel injection control apparatus shown in FIG. 1.

As shown in FIG. 2, the control unit 100 includes a high pressure target value calculator 101, a high pressure controller 102, and a low pressure controller 103 as function portions that control the low-side fuel pressure PL and the high-side fuel pressure PH.

When a request value PHR of high-side fuel pressure is changed, the high pressure target value calculator 101 calculates a high pressure target value PHT, which is a target value of the high-side fuel pressure PH, so that the high pressure target value PHT gradually approaches the request value PHR. At this time, the high pressure target value calculator 101 calculates the high pressure target value PHT based on the engine rotation speed NE. A calculation method for increasing the high pressure target value PHT will be described later with reference to FIGS. 3 and 4. The high-side fuel pressure request value PHR may be changed, for example, when the running state of the internal combustion engine changes.

The high pressure controller 102 drives the intake valve 45, that is, controls the amount of fuel supplied by the high pressure fuel pump 40 to the direct injection delivery pipe 30, so that the high-side fuel pressure PH approaches the high pressure target value PHT calculated by the high pressure target value calculator 101. More specifically, the high pressure controller 102 calculates a feedforward correction amount VHFF so that the feedforward correction amount VHFF is increased as a request injection amount of the direct fuel injection valves 31 increases. The high pressure controller 102 calculates a feedback correction amount VHFB using a known feedback control that uses a high-side pressure deviation DPH, which is the difference obtained by subtracting the high-side fuel pressure PH from the high pressure target value PHT. The feedforward correction amount VHFF calculated by the high pressure controller 102 may be referred to as a "high pressure FF amount VHFF." The feedback correction amount VHFB calculated by the high pressure controller 102 may be referred to as a "high pressure FB amount VHFB."

The high pressure controller 102 calculates the sum of the high pressure FF amount VHFF and the high pressure FB amount VHFB, which have been obtained through calculation, as an amount of fuel supplied by the high pressure fuel pump 40 to the direct injection delivery pipe 30. The high pressure controller 102 controls driving of the intake valve 45 based on the calculated fuel supply amount and the engine rotation speed NE. More specifically, the high pressure controller 102 adjusts an open period of the intake valve 45 to control driving of the intake valve 45 so that as the calculated fuel supply amount increases, the amount of fuel flowing into the pressurization chamber 53 through the intake valve 45 increases. Also, the high pressure controller 102 adjusts the open period of the intake valve 45 to control driving of the intake valve 45 so that as the engine rotation speed NE increases, the amount of fuel flowing into the pressurization chamber 53 through the intake valve 45 decreases.

The low pressure controller 103 controls the low-side fuel pressure PL by controlling driving of the low pressure fuel pump 12. More specifically, the low pressure controller 103 calculates a feedforward correction amount VLFF based on the request injection amount of the port fuel injection valves 21, the request injection amount of the direct fuel injection valves 31, and an increased amount of the high pressure target value PHT, which corresponds to an increase rate of the high pressure target value PHT. A method for calculating the feedforward correction amount VLFF with the low pressure controller 103 will be described later with reference to FIG. 5. The low pressure controller 103 calculates a feedback correction amount VLFB using a known feedback control that uses a low-side pressure deviation DPL, which is the difference obtained by subtracting the low-side fuel pressure PL from a low pressure target value PLT, which is a target value of the low-side fuel pressure PL. The feedforward correction amount VLFF calculated by the low pressure controller 103 may be referred to as a "low pressure FF amount VLFF." The feedback correction amount VLFB calculated by the low pressure controller 103 may be referred to as a "low pressure FB amount VLFB."

The low pressure controller 103 calculates the sum of the low pressure FF amount VLFF and the low pressure FB amount VLFB, which have been obtained through calculation, as an amount of fuel supplied by the low pressure fuel pump 12 to the low pressure fuel passage 13. The low pressure controller 103 controls driving of the low pressure fuel pump 12 based on the calculated fuel supply amount.

A process routine executed by the high pressure target value calculator 101 when the high pressure target value PHT is increased will now be described with reference to FIGS. 3 and 4. The process routine shown in FIG. 3 is executed in predetermined calculation cycles until the high pressure target value PHT reaches the high-side fuel pressure request value PHR.

Figure 3:
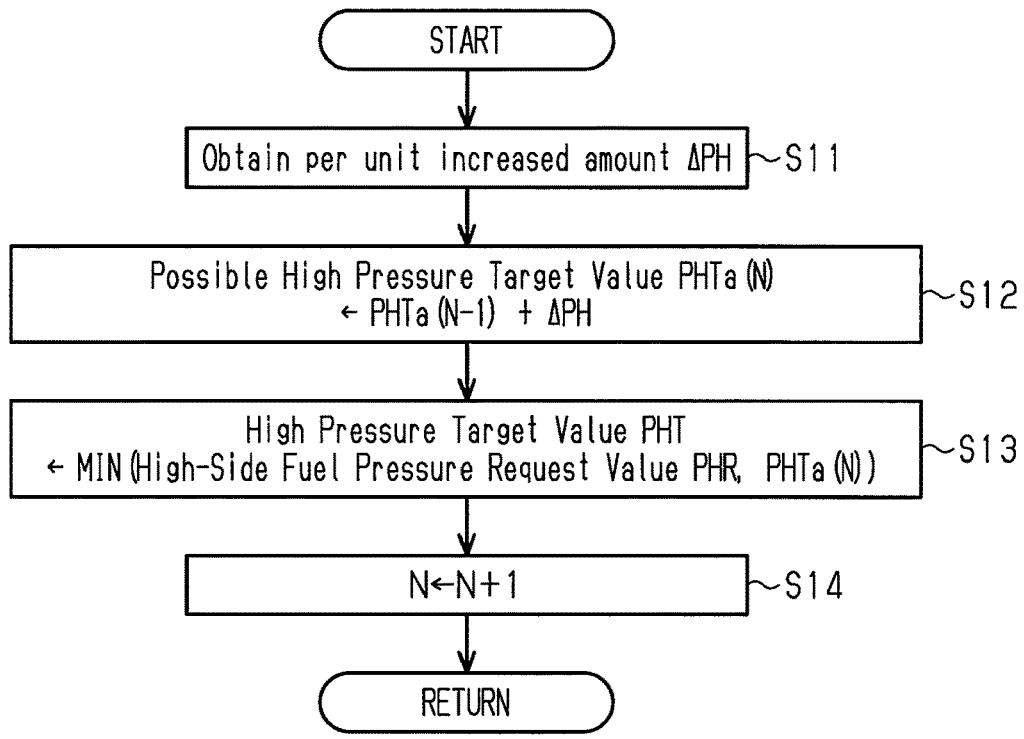
FIG. 3 is a flowchart showing the process routine executed to calculate a high pressure target value.
Figure 4:
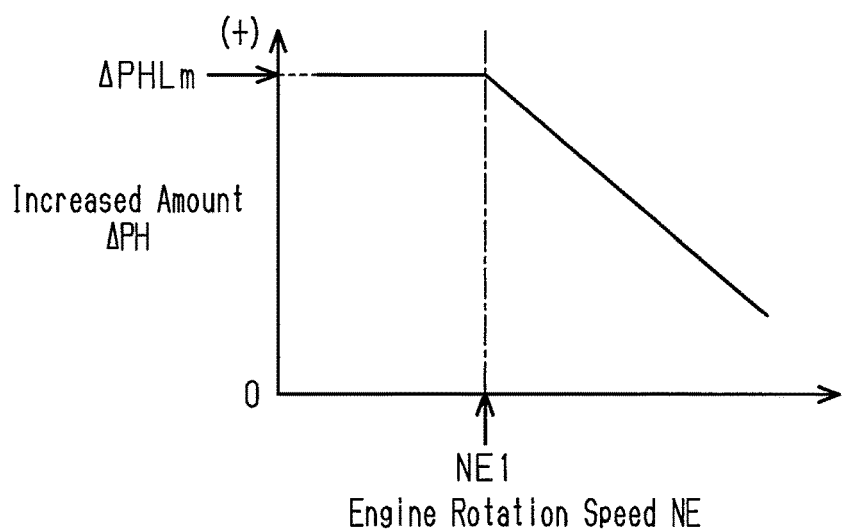
FIG. 4 is a map showing the relationship between the engine rotation speed and the increased amount.

As shown in FIG. 3, in the process routine, the high pressure target value calculator 101 obtains an increased amount ΔPH, which is an amount increased per unit calculation cycle, with reference to the map shown in FIG. 4 (S11).

The map shown in FIG. 4 will now be described. The map is used to obtain the increased amount ΔPH based on the engine rotation speed NE. As shown in FIG. 4, when the engine rotation speed NE is less than a predetermined rotation speed NE1, the increased amount ΔPH is equal to a predetermined increased amount upper limit value ΔPHLm. When the engine rotation speed NE is greater than or equal to the predetermined rotation speed NE1, the increased amount ΔPH is decreased as the engine rotation speed NE increases.

Thus, referring to FIG. 3, in step S11, when the engine rotation speed NE is high, the high pressure target value calculator 101 decreases the increased amount ΔPH as compared to when the engine rotation speed NE is low. A possible high pressure target value PHTa that was calculated in the preceding execution of the process routine is referred to as a preceding value PHTa(N−1) of the possible high pressure target value. The high pressure target value calculator 101 calculates the sum of the preceding value PHTa (N−1) of the possible high pressure target value and the increased amount ΔPH as a possible high pressure target value PHTa(N) (S12). The high pressure target value calculator 101 sets the high pressure target value PHT to the smaller one of the high-side fuel pressure request value PHR and the calculated possible high pressure target value PHTa (N) (S13). Thus, when the engine rotation speed NE is high, the high pressure target value calculator 101 lowers the increase rate of the high pressure target value PHT as compared to when the engine rotation speed NE is low. Then, the high pressure target value calculator 101 increments a calculation coefficient N by one (S14) and temporarily ends the process routine.

A process routine executed by the low pressure controller 103 to calculate the low pressure FF amount VLFF will now be described with reference to FIG. 5. The process routine is executed in predetermined calculation cycles.

Figure 5:
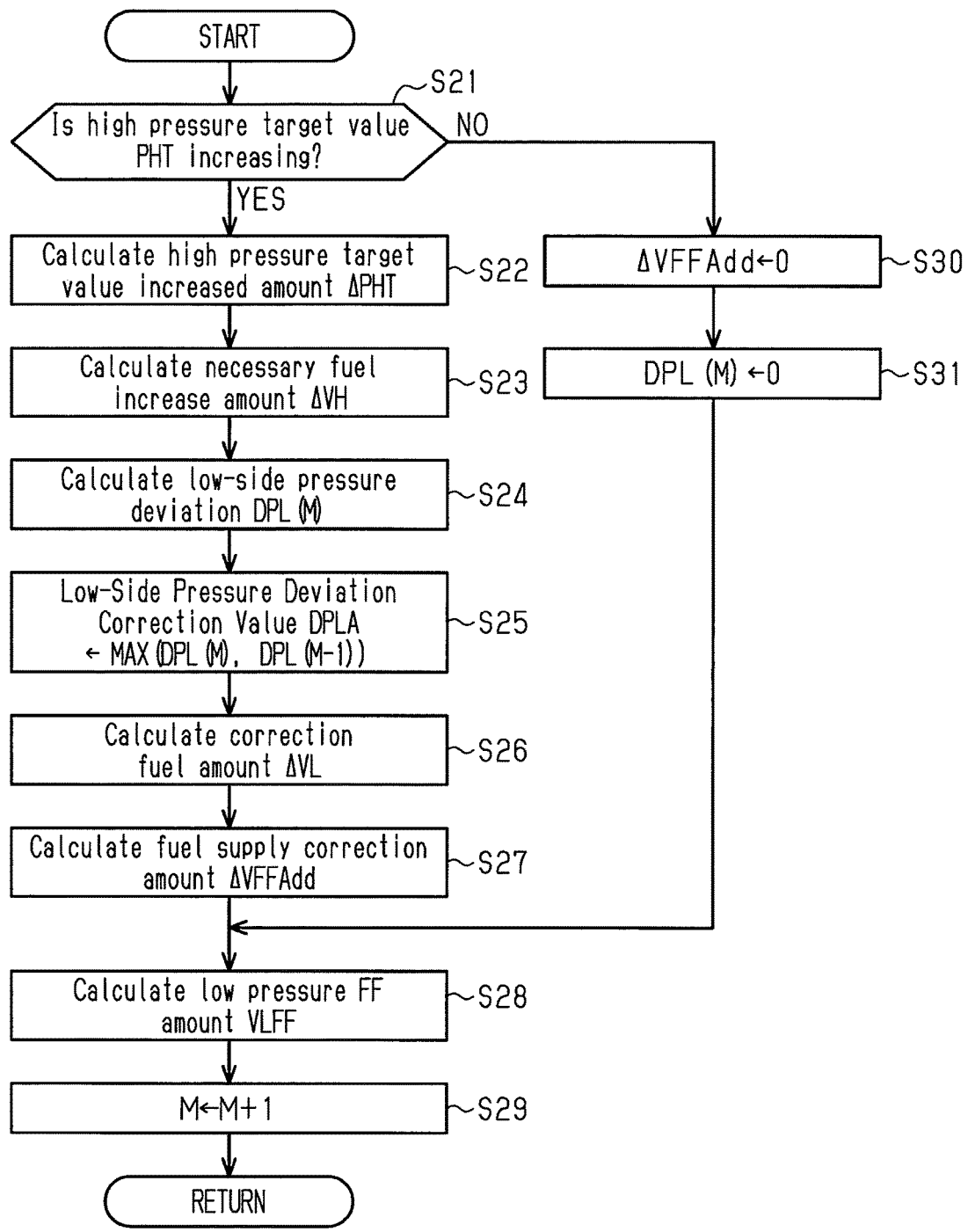
FIG. 5 is a flowchart showing the process routine executed to calculate a feedforward correction amount.

As shown in FIG. 5, in the process routine, the low pressure controller 103 determines whether or not the high pressure target value PHT, which is calculated by the high pressure target value calculator 101, is increasing (S21). If the high pressure target value PHT is increasing (S21: YES), the low pressure controller 103 calculates an increased amount ΔPHT of the high pressure target value (S22). The high pressure target value PHT in the preceding execution of the process routine is referred to as a preceding value of the high pressure target value PHT. The present high pressure target value PHT is referred to as a latest value of the high pressure target value PHT. The low pressure controller 103 calculates a difference obtained by subtracting the preceding value of the high pressure target value PHT from the latest value of the high pressure target value PHT as the high pressure target value increased amount ΔPHT.

The low pressure controller 103 calculates a necessary fuel increase amount ΔVH, which is the amount of fuel needed to increase the high-side fuel pressure PH by the increased amount ΔPHT (S23). For example, the low pressure controller 103 may calculate the necessary fuel increase amount ΔVH using the following relational equation (equation 1). In the relational equation (equation 1), "VH" is the volume of the direct injection delivery pipe 30, and "KH" is the bulk modulus of the direct injection delivery pipe 30. Thus, the low pressure controller 103 calculates the necessary fuel increase amount ΔVH so that as the high pressure target value increased amount ΔPHT increases, the necessary fuel increase amount ΔVH is increased. In other words, since the high pressure target value increased amount ΔPHT is a value corresponding to the increase rate of the high pressure target value PHT, the necessary fuel increase amount ΔVH increases as the increase rate of the high pressure target value PHT increases.

$$\Delta VH = \frac{\Delta PHT \cdot VH}{KH} \quad \text{Equation 1}$$

The low pressure controller 103 calculates a difference obtained by subtracting the low-side fuel pressure PL from the low pressure target value PLT as a low-side pressure deviation DPL(M) (S24). The low-side pressure deviation DPL in the preceding execution of the process routine is referred to as a preceding value DPL(M−1) of the low-side pressure deviation. The low pressure controller 103 sets a low-side pressure deviation correction value DPLA to the larger one of the low-side pressure deviation DPL(M) and the preceding value DPL(M−1) of the low-side pressure deviation (S25). The low pressure controller 103 calculates a correction fuel amount ΔVL using the following relational equation (equation 2) (S26). The correction fuel amount ΔVL is a value corresponding to an amount of fuel stored in the low pressure fuel passage 13 and decreased due to a response delay of the low pressure fuel pump 12. In the relational equation (equation 2), "VL" is the volume of the low pressure fuel passage 13, and "KL" is the bulk modulus of the low pressure fuel passage 13. Thus, the low pressure controller 103 calculates the correction fuel amount ΔVL so that as the low-side pressure deviation correction value DPLA increases, the correction fuel amount ΔVL is increased.

$$\Delta VL = \frac{DPLA \cdot VL}{KL} \quad \text{Equation 2}$$

The low pressure controller 103 calculates a difference obtained by subtracting the correction fuel amount ΔVL from the necessary fuel increase amount ΔVH as a fuel supply correction amount ΔVFFAdd (S27). The low pressure controller 103 calculates the sum of the request injection amount of the port fuel injection valves 21, the request injection amount of the direct fuel injection valves 31, and the fuel supply correction amount ΔVFFAdd as the low pressure FF amount VLFF (S28). More specifically, the low pressure controller 103 calculates the low pressure FF amount VLFF so that the low pressure FF amount VLFF is increased as the request injection amount of the port fuel injection valves 21 increases. Also, the low pressure controller 103 calculates the low pressure FF amount VLFF so that the low pressure FF amount VLFF is increased as the request injection amount of the direct fuel injection valves 31 increases. Additionally, the low pressure controller 103 calculates the low pressure FF amount VLFF so that the low pressure FF amount VLFF is increased as the fuel supply correction amount ΔVFFAdd increases. Subsequently, the low pressure controller 103 increments a calculation coefficient M by one (S29) and temporarily ends the process routine.

In step S21, if the high pressure target value PHT is not increasing (NO), the low pressure controller 103 sets the fuel supply correction amount ΔVFFAdd to zero (S30). Then, the low pressure controller 103 sets the low-side pressure deviation DPL(M) to zero (S31) and proceeds to step S28, which has been described.

The operation and advantages when the high pressure target value PHT is increased will now be described with reference to FIG. 6.

Figure 6:
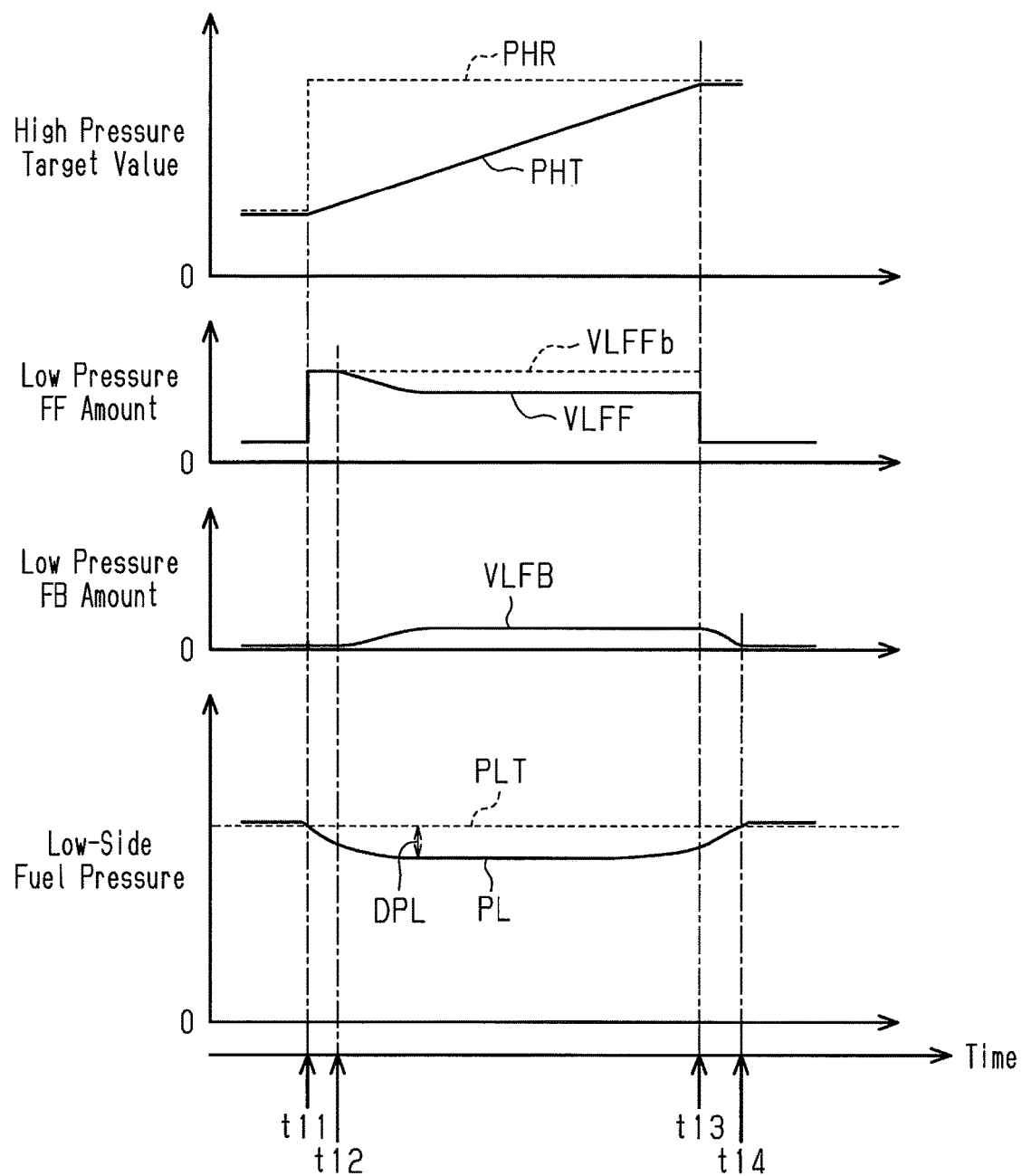
FIG. 6 is a time chart when the high pressure target value is increased.

As shown in FIG. 6, before time t11, the high pressure target value PHT is kept at a constant value. Before time t11, the low-side pressure deviation DPL is small. Thus, the low pressure FB amount VLFB is close to zero. The low pressure FF amount VLFF is equal to the sum of the request injection amount of the port fuel injection valves 21 and the request injection amount of the direct fuel injection valves 31.

The high-side fuel pressure request value PHR increases at time t11. In the period from time t11 to time t13, the high pressure target value PHT is increased at a rate corresponding to the engine rotation speed NE. In the example shown in FIG. 6, for the sake of brevity, the engine rotation speed NE is assumed to be constant until the high pressure target value PHT reaches the request value PHR.

When the high pressure target value PHT is increasing in such a manner, the high pressure fuel pump 40 is driven to increase the high-side fuel pressure PH in synchronization with the high pressure target value PHT. As a result, the fuel of the low pressure fuel passage 13 is supplied to the direct injection delivery pipe 30. Thus, when the high pressure target value PHT is increasing, the necessary fuel increase amount ΔVH is calculated so that the necessary fuel increase amount ΔVH is increased as the high pressure target value increased amount ΔPHT is increased, that is, as the increase rate of the high pressure target value PHT is increased.

The necessary fuel increase amount ΔVH corresponds to the amount of fuel supplied from the low pressure fuel passage 13 to the direct injection delivery pipe 30 in accordance with the increase in the high pressure target value PHT. The low pressure FF amount VLFF is calculated using the fuel supply correction amount ΔVFFAdd, which is calculated based on the necessary fuel increase amount ΔVH. Thus, the low pressure FF amount VLFF increases in accordance with the increase in the high pressure target value PHT. Driving of the low pressure fuel pump 12 is controlled based on the sum of the low pressure FF amount VLFF, which is calculated as described above, and the low pressure FB amount VLFB. Therefore, when the high pressure target value PHT is increased, before the low-side pressure deviation DPL is increased to a certain level and the low pressure FB amount VLFB is increased, the amount of fuel supplied by the low pressure fuel pump 12 to the low pressure fuel passage 13 increases. This limits decreases in the low-side fuel pressure PL when the high pressure target value PHT is increased. Further, when decreases in the low-side fuel pressure PL are limited, lowering the accuracy of the fuel injection amount of the port fuel injection valves 21 and generation of vapor in the low pressure fuel passage 13 are limited.

There is a time lag due to a response delay of the low pressure fuel pump 12 from when a request for increasing the fuel supply amount of the low pressure fuel pump 12 is made due to an increase in the low pressure FF amount VLFF until the fuel supply amount of the low pressure fuel pump 12 is actually increased. Thus, for example, in a period from time t11 to time t12, even when the low pressure fuel pump 12 is controlled based on the low pressure FF amount VLFF, which is calculated based on the high pressure target value increased amount ΔPHT, an increase in the high pressure target value PHT may cause a decrease in the low-side fuel pressure PL.

When the low-side fuel pressure PL is decreased as described above, the low-side pressure deviation DPL increases. Thus, the low pressure FB amount VLFB increases. When the low pressure fuel pump 12 is controlled based on the sum of the low pressure FF amount VLFF and the low pressure FB amount VLFB, the low pressure fuel pump 12 may supply an excessive amount of fuel to the low pressure fuel passage 13.

In this regard, in the present embodiment, the low pressure FF amount VLFF is calculated based on the low-side pressure deviation DPL. More specifically, as the low-side pressure deviation DPL increases, the correction fuel amount ΔVL increases (S26 in FIG. 5). The correction fuel amount ΔVL is a value corresponding to the low pressure FB amount VLFB. As the correction fuel amount ΔVL increases, the low pressure FF amount VLFF decreases. In FIG. 6, the broken line in the time chart showing the low pressure FF amount indicates a comparative example of a low pressure FF amount VLFFb, which is a low pressure FF amount VLFFb that is calculated irrespective of the low-side pressure deviation DPL. More specifically, the low pressure FF amount VLFFb of the comparative example is a low pressure FF amount that is calculated when the fuel supply correction amount ΔVFFAdd is assumed to be equal to the low-side pressure deviation correction value DPLA.

In the example shown in FIG. 6, from time t12, the low-side pressure deviation DPL affects the low pressure FF amount VLFF. The low pressure FF amount VLFF is less than the low pressure FF amount VLFFb of the comparative example. Thus, in the present embodiment, when the low-side pressure deviation DPL is increased to a certain level, the low pressure FF amount VLFF decreases as the low pressure FB amount VLFB increases. As a result, a situation in which the low pressure fuel pump 12 supplies an excessive amount of fuel to the low pressure fuel passage 13 is limited. Thus, the low-side fuel pressure PL will not easily exceed the low pressure target value PLT. In other words, occurrence of an overshoot of the low-side fuel pressure PL is limited.

In the example shown in FIG. 6, at time t13, the high pressure target value PHT is equal to the high-side fuel pressure request value PHR. Thus, after time t13, the high pressure target value PHT is maintained. After time t13, as in before time t11, the low pressure FF amount VLFF is equal to the sum of the request injection amount of the port fuel injection valves 21 and the request injection amount of the direct fuel injection valves 31. As a result, the low pressure FF amount VLFF is decreased from that of before time t13. At time t14, the low-side pressure deviation DPL is substantially zero.

Since the high pressure fuel pump 40 is driven by rotation of the camshaft 80, the fuel discharge amount of the high pressure fuel pump 40 tends to increase as the engine rotation speed NE increases. Thus, when the fuel discharge amount of the high pressure fuel pump 40 increases, the low-side fuel pressure PL tends to decrease. In this regard, in the present embodiment, when the high pressure target value PHT is increased, the high pressure target value PHT is configured to increase more slowly when the engine rotation speed NE is high than when the engine rotation speed NE is low. Thus, even when the engine rotation speed NE is high, a decrease in the low-side fuel pressure PL caused by an increase in the high pressure target value PHT does not easily occur. Therefore, when the high pressure target value PHT starts to increase, an increase in the low-side pressure deviation DPL is limited.

The above embodiment may be changed to other embodiments as described below.

The low pressure fuel injection valves that inject fuel of the low pressure fuel passage 13, that is, the port fuel injection valves 21 of the above embodiment may be omitted from the fuel injection control apparatus 10. With this configuration, when the high pressure target value PHT is not increased, the low pressure FF amount VLFF is equal to the request injection amount of the direct fuel injection valves 31. When the high pressure target value PHT is increased, the low pressure FF amount VLFF is calculated based on the request injection amount of the direct fuel injection valves 31 and the high pressure target value increased amount ΔPHT.

In the above embodiment, when the high pressure target value PHT is increased, the increase rate of the high pressure target value PHT is varied in accordance with the engine rotation speed NE. Instead, the increase rate of the high pressure target value PHT, that is, the increased amount ΔPH, may be determined based on the engine rotation speed NE at a point in time when the high pressure target value PHT starts to increase.

The fuel injection control apparatus 10 may include an electric high pressure fuel pump. In this case, the fuel discharge amount of the high pressure fuel pump may be controlled irrespective of the engine rotation speed NE. Thus, when the configuration includes an electric high pressure fuel pump, the increase rate of the high pressure target value PHT, that is, the increased amount ΔPH, does not necessarily have to vary in accordance with the engine rotation speed NE.

Even if the low-side fuel pressure PL exceeds the low pressure target value PLT, when the port fuel injection valves 21 are injecting fuel, the low-side fuel pressure PL is easily decreased to the low pressure target value PLT as compared to when the port fuel injection valves 21 are not injecting fuel. In this regard, under a situation in which the port fuel injection valves 21 are not injecting fuel, when the high pressure target value PHT is increased, the low pressure FF amount VLFF may be calculated based on the low-side pressure deviation DPL. Under a situation in which the port fuel injection valves 21 are injecting fuel, when the high pressure target value PHT is increased, the low pressure FF amount VLFF may be calculated irrespective of the low-side pressure deviation DPL.

To increase the high pressure target value PHT, before the high pressure target value PHT is increased, the low pressure FF amount VLFF may be calculated based on a decreased amount of the low-side fuel pressure PL caused by an increase in the high pressure target value PHT. In this case, when a request for increasing the high pressure target value PHT is made, the high pressure target value PHT starts to increase after driving of the low pressure fuel pump 12 is controlled based on the low pressure FF amount VLFF, which is calculated based on the decreased amount of the low-side fuel pressure PL caused by an increase in the high pressure target value PHT. With such a control configuration, the low-side fuel pressure PL is increased before the high pressure target value PHT is increased. Thus, when the high pressure target value PHT starts to increase, the low-side fuel pressure PL is not likely to be lower than the low pressure target value PLT. This allows the high pressure target value PHT to quickly increase to the high-side fuel pressure request value PHR.

Therefore, the present examples and embodiments are to be considered as illustrative and not restrictive and the invention is not to be limited to the details given herein, but may be modified within the scope and equivalence of the appended claims.

The invention claimed is:

1. A fuel injection control apparatus for an internal combustion engine comprising:
   a low pressure fuel pump configured to pump fuel from a fuel tank;
   a low pressure fuel passage through which the fuel discharged from the low pressure fuel pump flows;
   a high pressure fuel pump configured to pressurize the fuel supplied from the low pressure fuel passage;
   a high pressure fuel passage through which the fuel pressurized by the high pressure fuel pump flows;
   a fuel injection valve configured to inject the fuel of the high pressure fuel passage;
   a high pressure controller configured to control driving of the high pressure fuel pump so that fuel pressure of the high pressure fuel passage approaches a high pressure target value, which is a target value of the fuel pressure; and
   a low pressure controller configured to control driving of the low pressure fuel pump, wherein
   the low pressure controller is configured to calculate a feedforward correction amount so that when the high pressure target value increases, the feedforward correction amount increases as a request injection amount of the fuel injection valve increases and also increases as an increase rate of the high pressure target value increases,
   the low pressure controller is configured to calculate a feedback correction amount based on a low-side pressure deviation when the high pressure target value increases, wherein the low-side pressure deviation is a difference obtained by subtracting fuel pressure of the low pressure fuel passage from a low pressure target value, which is a target value of fuel pressure of the low pressure fuel passage, and
   the low pressure controller is further configured to control driving of the low pressure fuel pump based on a sum of the feedforward correction amount and the feedback correction amount.

2. The fuel injection control apparatus for an internal combustion engine according to claim 1, wherein the low pressure controller calculates the feedforward correction amount so that when the high pressure target value increases, the feedforward correction amount decreases as the low-side pressure deviation increases.

3. The fuel injection control apparatus for an internal combustion engine according to claim 1, wherein
   the high pressure fuel pump is configured to be driven by rotation of a camshaft of the internal combustion engine, and
   the fuel injection control apparatus further comprises a high pressure target value calculator that calculates the high pressure target value so that when the high pressure target value increases, the increase rate of the high pressure target value is lower at a high engine rotation speed than at a low engine rotation speed.

4. The fuel injection control apparatus for an internal combustion engine according to claim 1, wherein
   the fuel injection valve is a high pressure fuel injection valve,
   the fuel injection control apparatus comprises a low pressure fuel injection valve configured to inject the fuel of the low pressure fuel passage, and
   the low pressure controller calculates the feedforward correction amount so that the feedforward correction amount increases as a sum of a request injection amount of the high pressure fuel injection valve and a request injection amount of the low pressure fuel injection valve increases.

5. A method for operating a fuel injection control apparatus for an internal combustion engine, wherein the fuel injection control apparatus includes a low pressure fuel pump configured to pump fuel from a fuel tank, a low pressure fuel passage through which the fuel discharged from the low pressure fuel pump flows, a high pressure fuel pump configured to pressurize the fuel supplied from the low pressure fuel passage, a high pressure fuel passage through which the fuel pressurized by the high pressure fuel pump flows, and a fuel injection valve configured to inject the fuel of the high pressure fuel passage, the method comprising:
   controlling driving of the high pressure fuel pump so that fuel pressure of the high pressure fuel passage approaches a high pressure target value, which is a target value of the fuel pressure;
   controlling driving of the low pressure fuel pump;

calculating a feedforward correction amount so that when the high pressure target value increases, the feedforward correction amount increases as a request injection amount of the fuel injection valve increases and also increases as an increase rate of the high pressure target value increases;

calculating a feedback correction amount based on a low-side pressure deviation when the high pressure target value increases, wherein the low-side pressure deviation is a difference obtained by subtracting fuel pressure of the low pressure fuel passage from a low pressure target value, which is a target value of fuel pressure of the low pressure fuel passage; and controlling driving of the low pressure fuel pump based on a sum of the feedforward correction amount and the feedback correction amount.

6. A fuel injection control apparatus for an internal combustion engine comprising:

a low pressure fuel pump configured to pump fuel from a fuel tank;

a low pressure fuel passage through which the fuel discharged from the low pressure fuel pump flows;

a high pressure fuel pump configured to pressurize the fuel supplied from the low pressure fuel passage;

a high pressure fuel passage through which the fuel pressurized by the high pressure fuel pump flows;

a fuel injection valve configured to inject the fuel of the high pressure fuel passage; and circuitry, wherein the circuitry is configured to perform:

controlling driving of the high pressure fuel pump so that fuel pressure of the high pressure fuel passage approaches a high pressure target value, which is a target value of the fuel pressure;

controlling driving of the low pressure fuel pump;

calculating a feedforward correction amount so that when the high pressure target value increases, the feedforward correction amount increases as a request injection amount of the fuel injection valve increases and also increases as an increase rate of the high pressure target value increases;

calculating a feedback correction amount based on a low-side pressure deviation when the high pressure target value increases, wherein the low-side pressure deviation is a difference obtained by subtracting fuel pressure of the low pressure fuel passage from a low pressure target value, which is a target value of fuel pressure of the low pressure fuel passage; and controlling driving of the low pressure fuel pump based on a sum of the feedforward correction amount and the feedback correction amount.

\* \* \* \* \*